INVENTOR.
PAUL A. NOXON
BY
ATTORNEY

INVENTOR.
PAUL A. NOXON
BY Herbert L. Davis
ATTORNEY

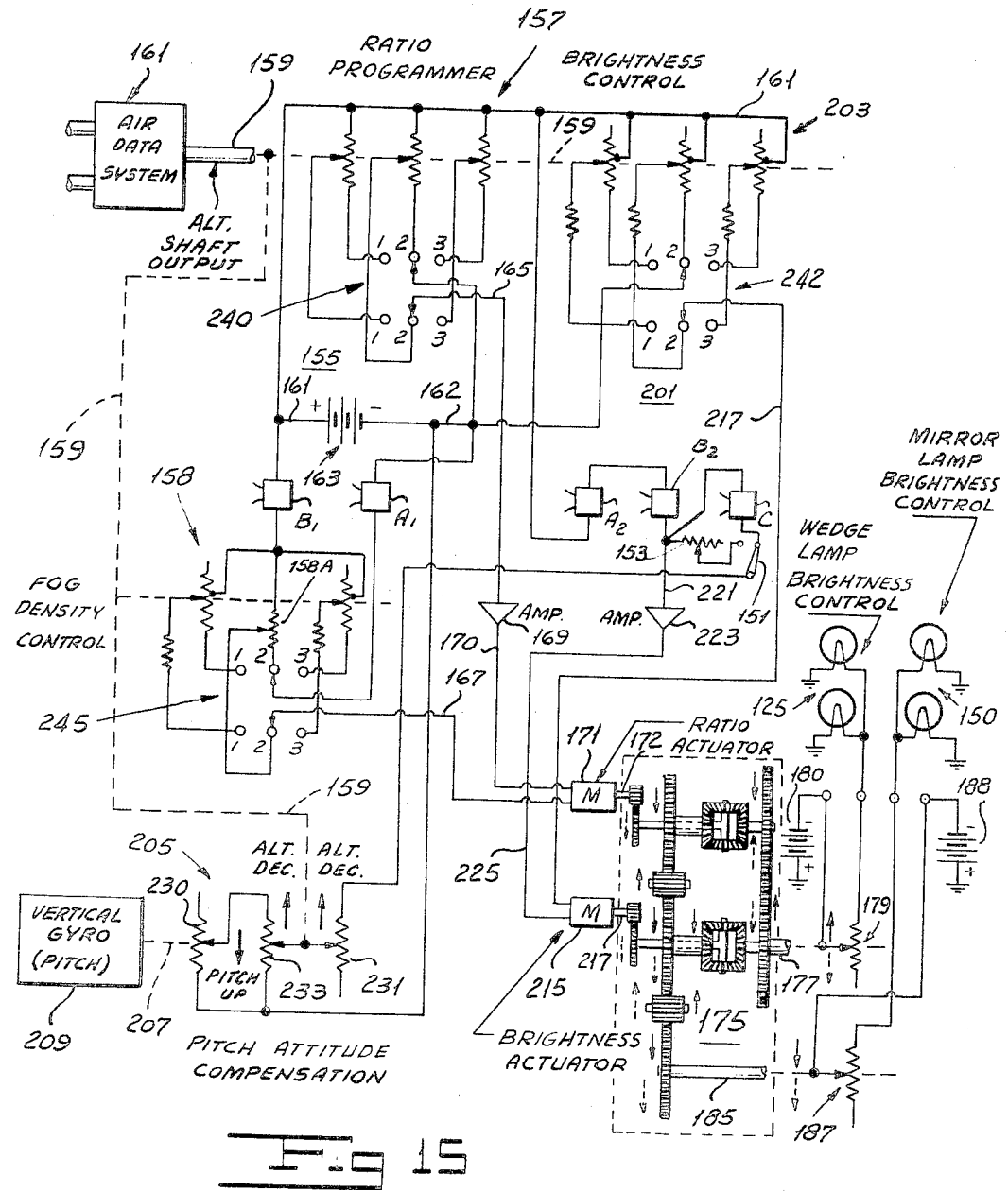

United States Patent Office 3,436,840
Patented Apr. 8, 1969

3,436,840
FOG SIMULATOR AND METHOD FOR ACCOMPLISHING AIRBORNE SIMULATION OF A FOG
Paul A. Noxon, Tenafly, N.J., assignor to The Bendix Corporation, a corporation of Delaware
Filed Aug. 31, 1966, Ser. No. 576,298
Int. Cl. G09b 9/08
U.S. Cl. 35—12
32 Claims

ABSTRACT OF THE DISCLOSURE

An optical method and means to effect in an aircraft an airborne simulation of a fog in a visual display which provides the effect of viewing the real world through the simulated fog under realistic dynamic fog conditions which change with the flight condition of the aircraft.

---

This invention relates to a fog simulator and a method for accomplishing airborne simulation of a fog and more particularly to a means to simulate in an aircraft the presence of a fog by a realistic visual display employing an optical system that separates attenuation of a direct view from background illumination and to a method for accomplishing airborne simulation of fog conditions by the selective programming of both ratio and total brightness of the fog simulation with the operating conditions of an aircraft.

In test programs concerned with display systems, visual aids, and other devices for the landing of aircraft under conditions of low visibility, as well as the training and proficiency testing of pilots under these conditions, it has been the practice in recent years to employ various means to simulate the presence of fog.

Such devices have generally taken the form of Mylar or graduated ground glass screens, interposed between the pilot's eyes and the visual scene. While usually affixed to the windshield, stabilization of these screens relative to various parameters has been attempted. In either case, the objective has been to limit the pilot's visual sector by restricting it to some angle depressed from the horizontal, and generally to create the impression of looking through a fog.

Such devices have not met with much success for a number of reasons:

*First.*—Such screens tend to diffuse or defocus any object seen through them in an attenuated fashion. A real fog, however, has only the effect of attenuating the light refleced from an object (in daylight) progressively with distance, coupled with an increasing overlay of illumination from the fog droplets until at cut off the objects cannot be distinguished by reason of low contrast with the background. At all points, however, any object seen at all can be seen in sharp focus. The same is true at night, except that lights tend to produce a local high intensity of background illumination or halo. The light itself, however, if seen at all wil be sharply focused.

*Second.*—As will be shown later, the gradient of optical effects of a fog, such as illumination overlay, over the angular range from cockpit cut off to the horizon is a strong function of altitude. A fixed gradient, such as provided by a ground glass screen cannot, therefore, approach the visual effect of descending through a fog.

*Third.*—Vertical motion of the pilot's eyes either because of compliance of the seat and his own body in turbulence, or by involuntary "peeking" can radically alter the visual sector dynamically and thus made the acquisition of valid data difficult.

*Fourth.*—Any screen interposed near the pilot's point of observation will be perceived by him for exactly what it is—a strictly local object—hence the illusion of an actual fog is never really achieved.

An object of the invention is to provide a fog simulator to overcome substantially all of the above difficulties.

Another object of the invention is to provide a fog simulator, including an optical device, in which the functions of attenuation and the provision of background illumination are separated and individually controlled.

Another object of the invention is to provide a fog simulator in which a fog pattern may be collimated at a distance, thus creating a vivid illusion of reality to the pilot.

Another object of the invention is to provide a method for accomplishing airborne simulation of fog conditions by selective programming of both ratio of total brightness of the fog simulation with altitude of the aircraft above a ground terrain.

Another object of the invention is to provide a method of modulating the brightness of the fog simulation with attitude of the aircraft in such a way that the brightness at the correct angle relative to the horizontal corresponding to the altitude of the aircraft is maintained.

Another object of the invention is to provide a method of selectively programming simulated fog conditions under homogenous, cloud base and "hook fog" conditions, as well as simulated night fog conditions.

Another object of the invention is to provide a fog simulator including means for presenting a computed, collimated, obscuring veil of light to the pilot and between the pilot and the outside world such as to reduce the contrast ratio and produce the effect of viewing the real world through the fog simulator under realistic dynamic fog conditions.

Another object of the invention is to provide such a fog simulator that will permit the training of pilots and the evaluation of pilot performance under consistent controlled dynamic conditions of flight in an aircraft.

Another object of the invention is to provide a fog simulator in which through means of collimation, the effects of pilot motion upon the system are eliminated, since the images will appear at infinity.

Another object of the invention is to provide a fog simulator in which images are developed with simple wedge lamps, a wedge filter, and mirror lamps so as to maintain known ratios of image brightness to ambient conditions as well as having programmed functions of pitch attitude, altitude and fog densities.

Another object of the invention is to provide in such a fog simulator an electromechanical computer to control the wedge lamp and mirror lamp intensities in accordance with predetermined programmed fog conditions.

Another object of the invention is to provide in the fog simulator novel means for selectively programming both ratio and total brightness of the fog simulation with the altitude of the aircraft above a ground terrain.

Another object of the invention is to provide in a fog simulator novel means for modulating the brightness of the fog simulation with the pitch attitude of the aircraft in such a way that the brightness of the simulated fog is dependent upon the angle of flight of the aircraft relative to the horizontal at the prevailing altitude of the aircraft.

Another object of the invention is to provide in a fog simulator novel means for selectively programming simulated fog conditions under homogenous, cloud base and "hook fog" conditions.

Another object of the invention is to provide in a fog simulator novel means to simulate night fog conditions.

The system concept employed in the fog simulator of the present invention is that of presenting a computed, collimated, obscuring veil of light to the pilot between him and the outside world such as to reduce the contrast ratio. This would produce the effect through the simulator of viewing the real world under realistic dynamic fog conditions. This airborne fog simulation device will permit training and evaluation of pilot performance under consistent controlled dynamic conditions of flight.

The system optically is somewhat similar to the concepts found in a Head-Up Display means of a type such as disclosed and claimed in a copending U.S. application Ser. No. 315,188 filed Oct. 10, 1963, by Francis Henry S. Rossire and assigned to The Bendix Corporation. By means of collimation, the effects of pilot motion upon the system are eliminated since the images will appear at infinity, as in the Head-Up Display means. The images are developed through means of a novel arrangement of wedge lamps, a wedge filter, and mirror lamps so as to maintain known ratios of image brightness to ambient conditions as well as having programmed functions of pitch attitude, altitude and fog densities such as to effect the desired programmed fog condition to be simulated.

These and other objects and features of the invention are pointed out in the following description in terms of the embodiments thereof which are shown in the accompanying drawings. It is to be understood, however, that the drawings are for the purpose of illustration only and are not a definition of the limits of the invention.

has been plotted as a function of angle of sight from an aircraft at a number of altitudes and from which it will be seen that the gradient of brightness vs. angle of sight (and therefore runway range) is, especially at the cut off distance, a strong function of altitude.

Figure 12:
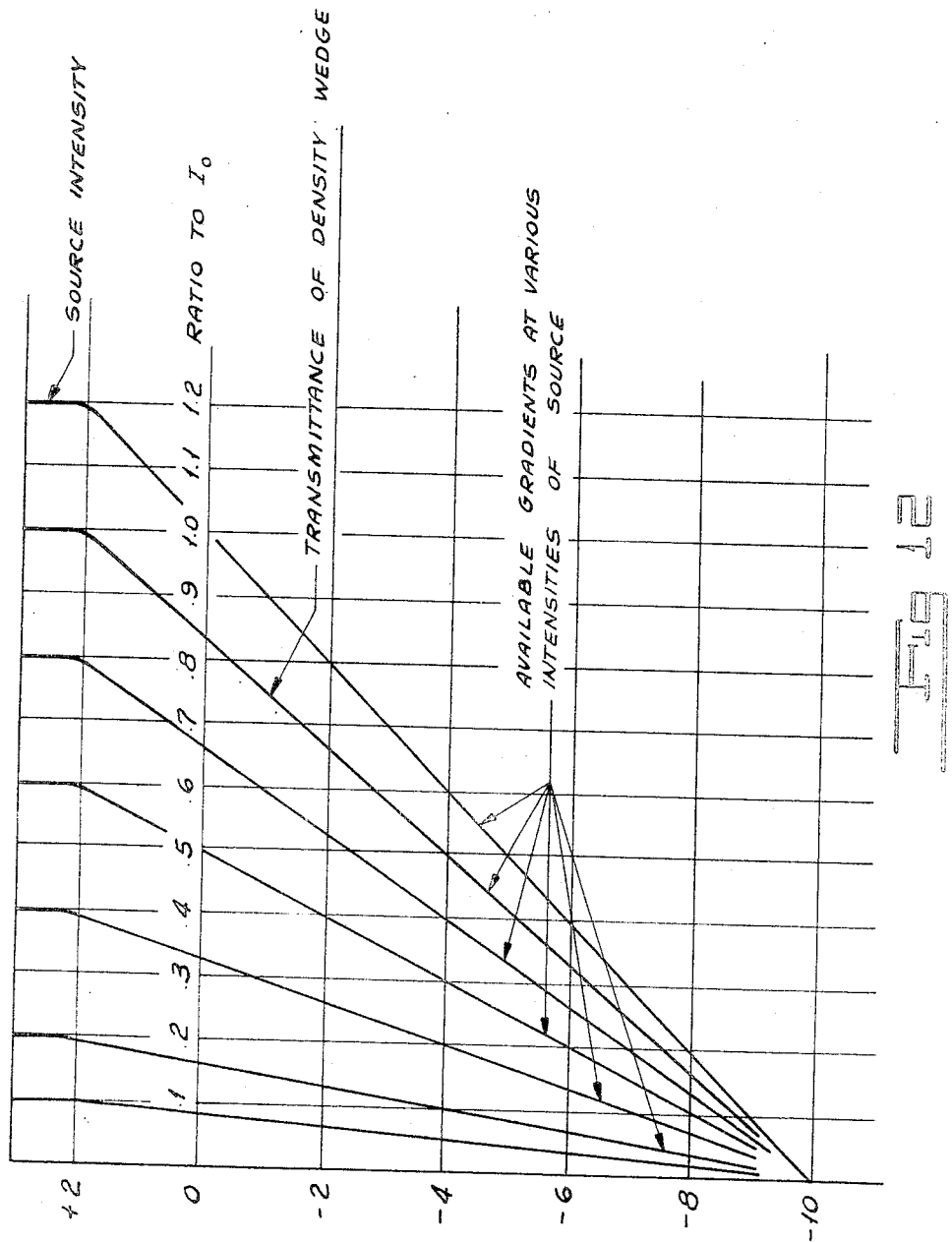

FIGURE 12 is a graphical illustration showing that by a programmed illumination of a screen of fixed gradient that the illumination gradient may be controlled to predetermined values.

Figure 13:
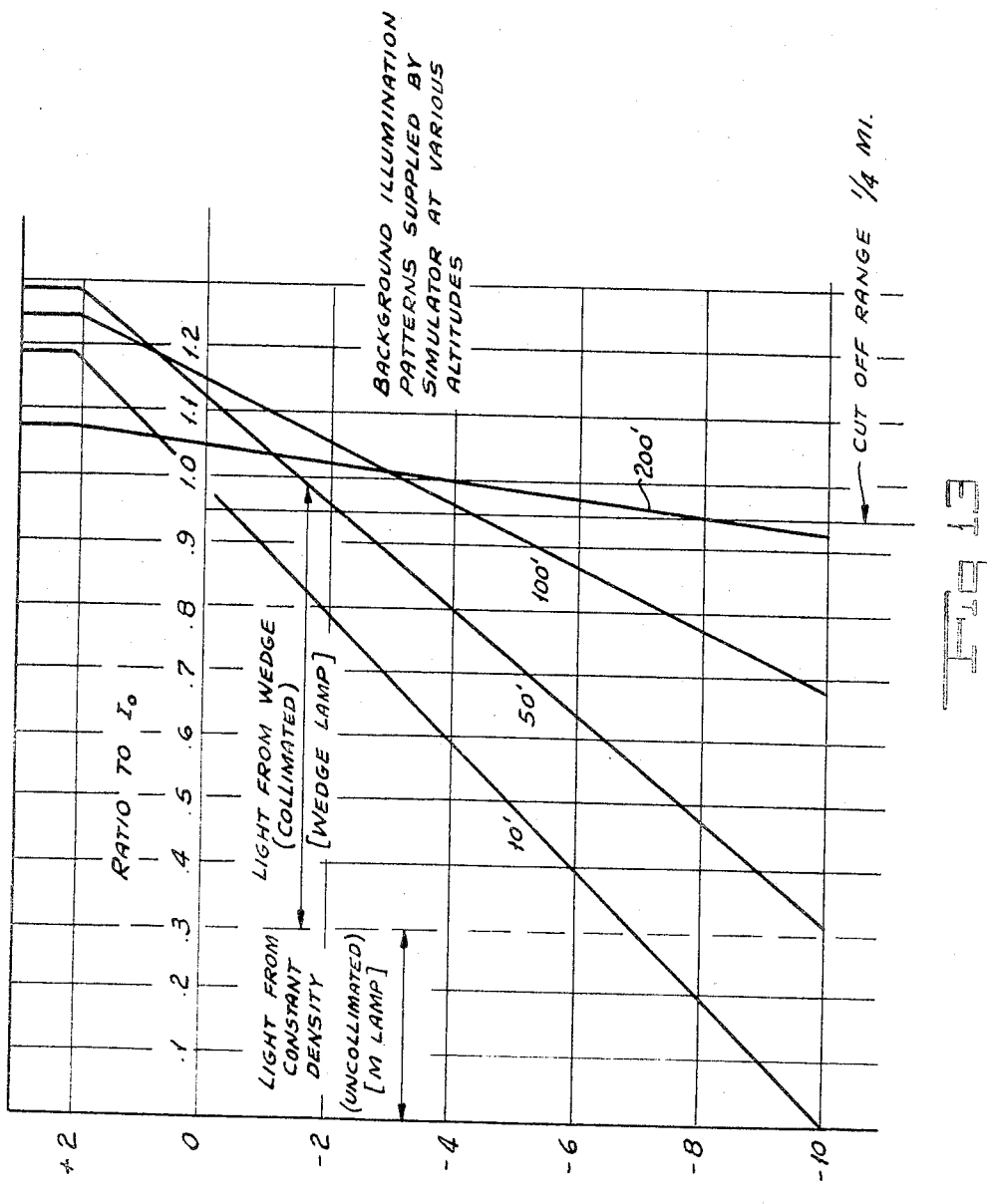

FIGURE 13 is a graphical illustration of a programmed background illumination supplied by the simulator to simulate fog conditions at various altitudes.

Figure 14:
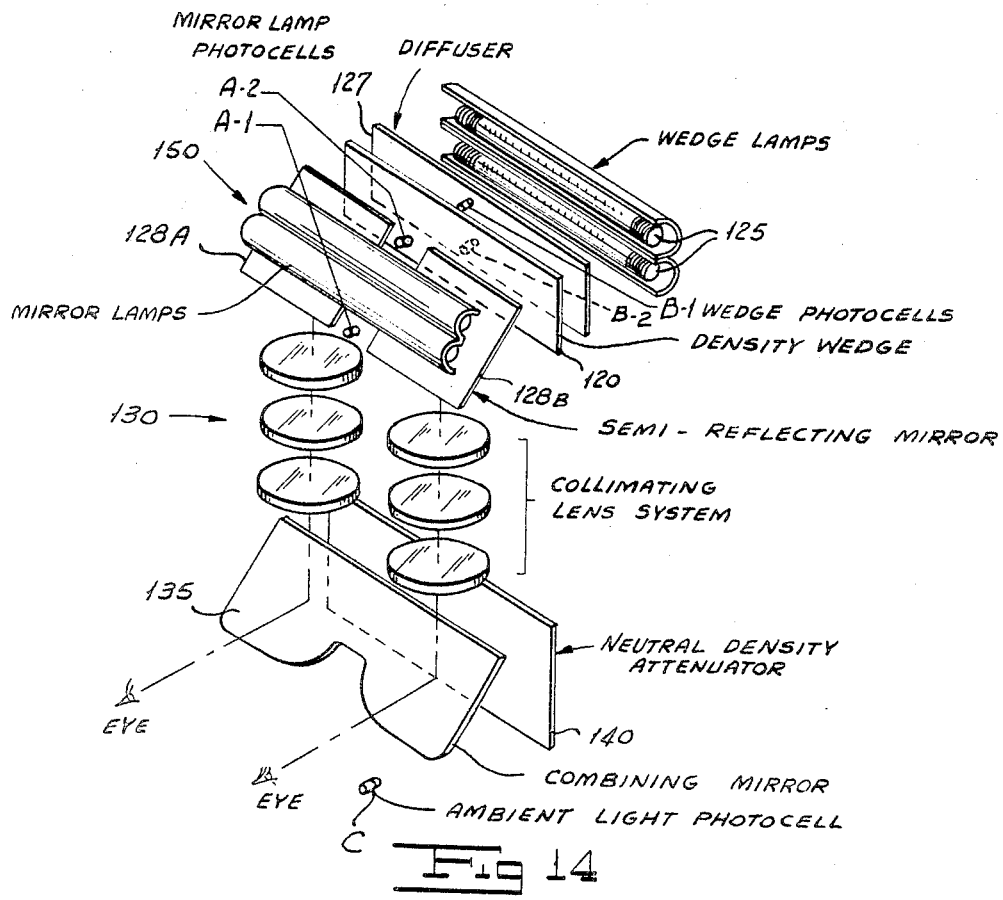

FIGURE 14 is an optical schematic view of a modified form of fog simulator embodying the present invention.

FIGURE 15 is a schematic wiring diagram of a control network for the modified form of the fog simulator shown schematically by FIGURE 14 and embodying the present invention.

Figure 16:
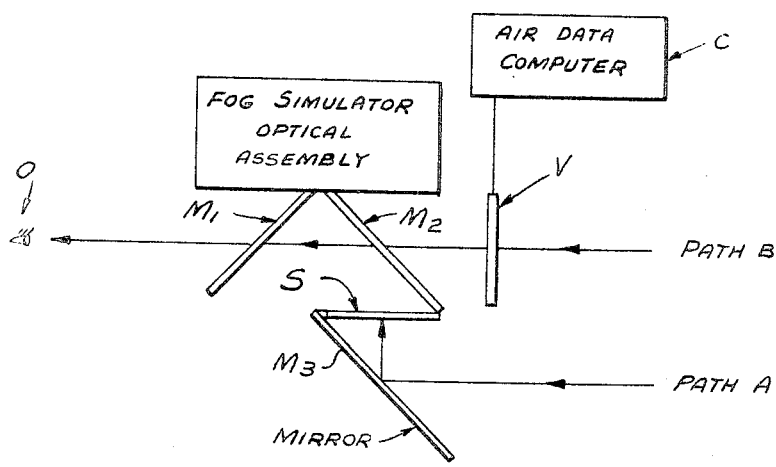

FIGURE 16 is an optical schematic view of a further modified form of fog simulator embodying the present invention.

Before proceeding with a description of the present invention, it would appear desirable to consider in some detail the characteristics of a natural fog. This may more clearly define the problem, and provide a better basis upon which to evaluate the effects of such compromises with reality which necessarily must be made.

The optical characteristics of a fog

In nature, the optical characteristics of a fog are subject to wide variations. The distribution of water droplets which constitute a true fog varies widely with altitude, and is normally by no means uniform in distribution laterally over an area. Furthermore, a fog such as normally encountered by landing aircraft in an urban area is almost always accompanied by a quantity of dust or smoke particles, which greatly alters its optical characteristics.

Notwithstanding the above, it is still useful to consider the optical effects of a homogenous pure fog. While probably never encountered in nature, nevertheless the normal variations actually present in the real situation are so wide that a simulation based on a homogenous fog structure will undoubtedly appear to the eye as quite creditable. Furthermore, from the above considerations it is probably not worthwhile to arrive at the precise relationships existing even in a hypothetical homogenous fog. Fairly simple assumptions based on geometrical optics then can be made, which while only approximately true in nature, nevertheless permit simple mathematical relationships to be derived which can be very useful. On this basis the following optical effects encountered in nature may be considered.

Figure 1:
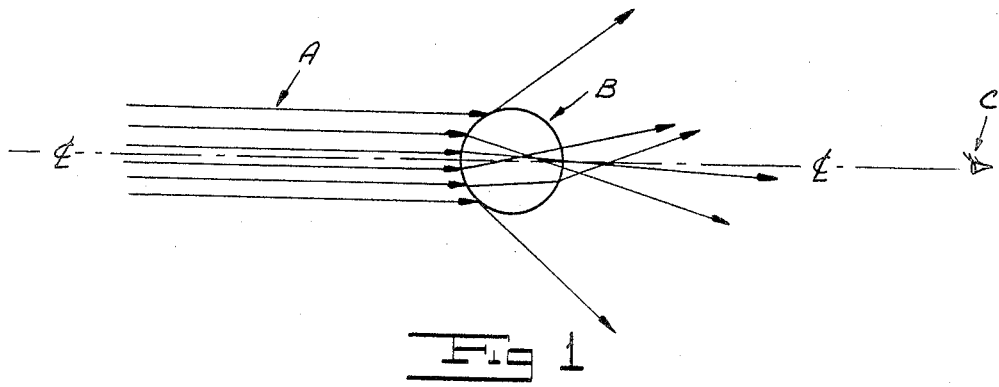
FIGURE 1 is a diagrammatic illustration showing a bundle of transmitted light rays reflected from a distant object which encounter a fog water droplet on the way to the eye of an observer, in which the bundle of transmitted light rays have been indicated by the letter A, the fog water droplet by the letter B and the eye of the observer by the letter C.

First, there may be considered the phenomena of a bundle of light rays reflected from a distant object which encounters a fog droplet on the way to the eye of an observer (see FIGURE 1). All of the light rays (except the mathematical principle light ray) are deflected by reflection from the surface of the drop, by diffraction, or refraction internally, so that substantially none reaches the observer's eye. As seen by the observer then, the water droplet is an opaque object, which cuts off the transmitted light rays in proportion to its projected area.

Second, the ambient light existing in the interior of a fog in daylight consists of rays traveling in all directions in a perfectly diffuse fashion. In a dense fog it is literally true that not matter what direction the observer may look, the light intensity is the same. The fog is, in effect an almost perfect integrating sphere. This constant ambient intensity may be termed $I_0$.

Figure 2:
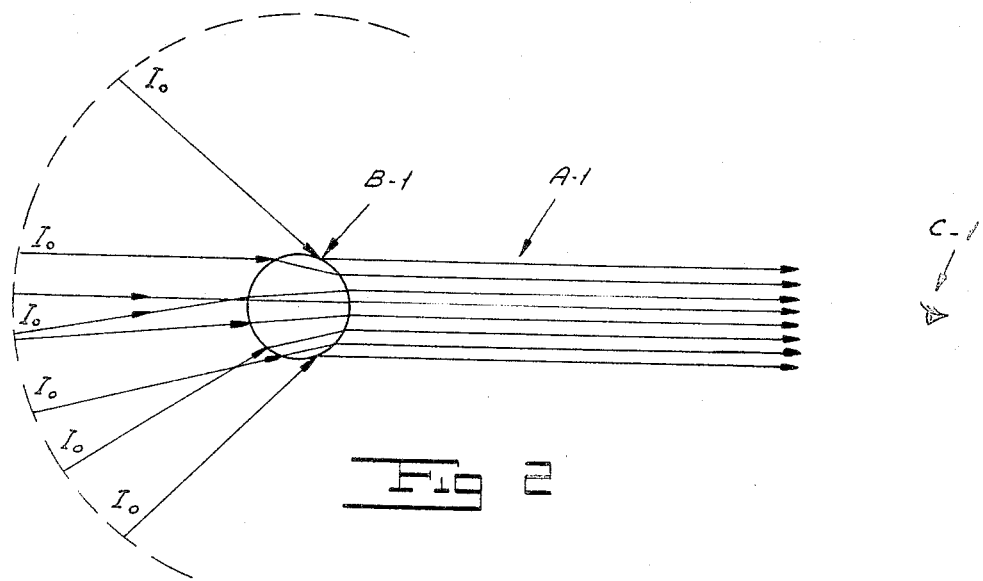
FIGURE 2 is a diagrammatic view illustrating the appearance of a droplet of water illuminated by ambient light rays, in which the reflected light rays have been indicated by the letter A–1, the water droplet by the letter B–1 and the eye of the observer by the letter C–1.

There may be further considered the appearance of a droplet of water illuminated by such a light source (see FIGURE 2). There is then presented a situation exactly opposite to that for transmitted light in that no matter what portion of the sphere is observed, light reaches the eye of the observer either via a reflective or refractive path from a source of identical intensity. There may be be assigned zero light loss to this operation—very nearly true—and to consider that any color spectrum produced by diffraction of a given ray within a drop is completely cancelled out to white by overlapping spectra of light rays traveling in different directions through the same drop from the diffuse source; to arrive at our third assumption: a fog droplet appears to the eye of the observer as a disc uniformly illuminated by the source intensity $I_0$, and the total light reflected by it in the direction of the observer will be in proportion to its projected area.

Figure 3:
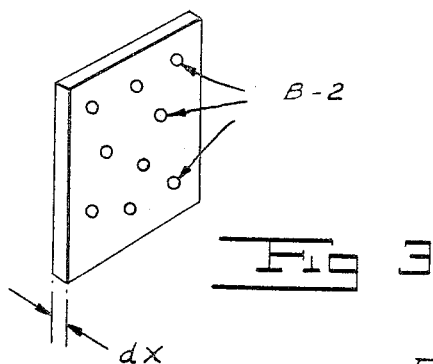
FIGURE 3 is a diagrammatic view of a lamina of fog having an area of unity and a thickness $dx$ such that within the lamina no water droplets indicated by the letter B–2 overlap.
Figure 4:
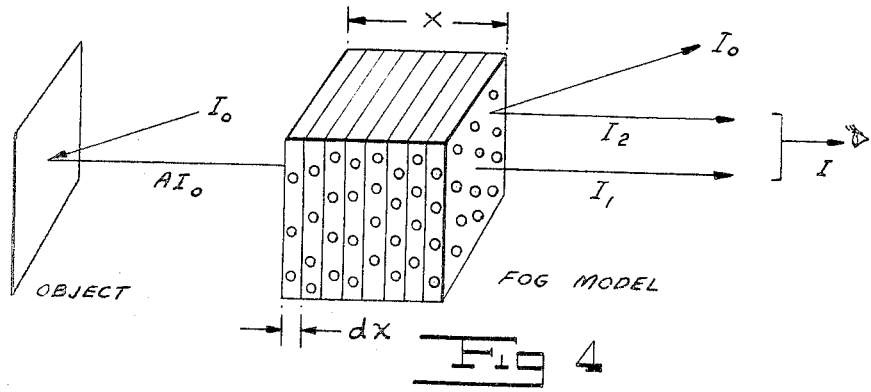
FIGURE 4 is a diagrammatic view of a fog model illustrating the reflection of a light ray from an object and through a plurality of fog laminae to the eye of an observer and in which each lamina has a thickness of $dx$ and the fog model a thickness of X.

There may be now constructed a fog model. In such a fog model, as shown by FIGURES 3 and 4, there may be considered a lamina of fog having an area of unity and a thickness $dx$ such that within the lamina no droplets overlap. Now in accordance with the previous assumptions, the optical effects of such a fog slice or lamina are controlled by the aggregate area of all the droplets within it. The letter $a$ may be assigned to denote this area. The complete fog consists, of course, of a great number of such fog slices or laminae in tandem.

There may be further considered the situation of an observer endeavoring to see an object of unit area in the environment under consideration (refer to FIGURE 4). The object to be observed is, of course, illuminated by the ambient light $I_0$, and the amount reflected depends on the reflectance coefficient which may be termed A, or the reflected light $I_0A$. Now the amount of light reflected from the observed object and finally arriving at the observer's eye will be $I_0A$ as attenuated by the fog. At the same time his eye will receive light reflected from the fog (back scatter) added to the transmitted light. Now the part of $I_0A$ which arrives at the eye of the observer will be in proportion to the area not covered by the aggregate non-overlapping area of the fog droplets existing in the total volume of fog included in the unit area times the distance between the object and the observer's eye. Also the reflected light observed will be in proportion to the aggregate non-overlapping dropping area. This may then be calculated as follows:

Let S=the area in question.

Now the increment of area contributed by each lamina (lenght $dx$) will be the product of its area factor $a$ multiplied by the area not already previously covered $(1-S)$ or $a(1-S)$.

This may be written as follows:

(1) $$\frac{dS}{dx}=a(1-S)$$

$$\frac{(-1)dS}{(1-S)}=(-1)adx$$

(2) $\quad S=1-e^{-ax}$ (area covered)

(3) $\quad (1-S)=e^{-ax}$ (area not covered)

Therefore transmitted light:

(4) $$I_1=I_0Ae^{-ax}$$

Reflected light:

(5) $$I_2=I_0(1-e^{-ax})$$

or $\quad I_1+I_2=I_0[Ae^{-ax}+(1-e^{-ax})]$ (6) $$I=I_0[1-(1-A)e^{-ax}]$$

Now the question as to whether a given object is visible or not will depend on its contrast with respect to the surrounding background. If the background is the sky, there may be assumed a visibility index as follows:

(7) $$V=\frac{I_0-I}{I_0}$$

Figure 5:
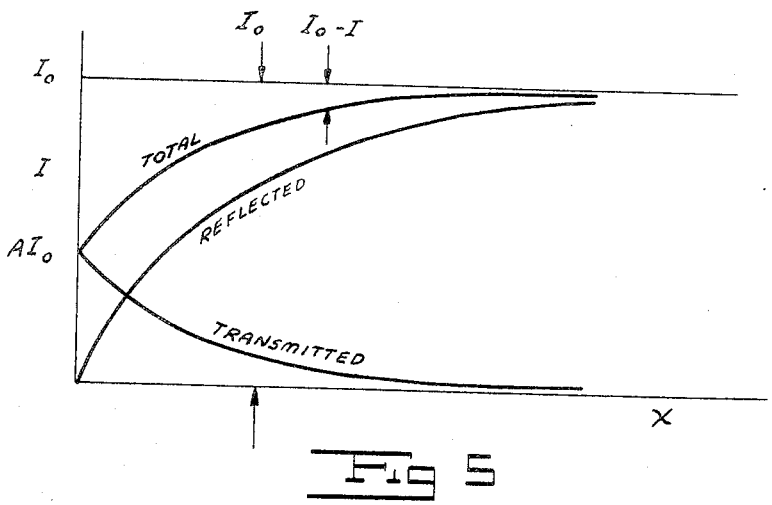
FIGURE 5 is a graphical illustration of the visibility of an object illuminated by ambient light.

(See FIGURE 5)

or $$V=\frac{I_0-I_0[1-(1-A)e^{-ax}]}{I_0}$$

$$V=1-1+(1-A)e^{-ax}$$

(8) $$V=(1-A)e^{-ax}$$

This is a non-dimensional number lying between 0 and unity.

The reflectance factor A is interesting. For example: if A is unity (a perfect reflector) the corresponding value of V is 0 for all distances—hence a perfect reflector cannot be seen. Conversely, the most visible object in a fog would be a black body. This is, of course, common knowledge—meteorological visibility, for example, refers to the distance a dark target can be seen against the horizon.

For completeness it should be interesting to examine the case where an object is to be perceived not against the sky, but against a background of different reflectance. Let this be called B.

Let $I_A$=total light reaching the eye of an observer from the direction of an object whose reflectance is A, and $I_B$=total light reaching the eye of the observer from the direction of the background or (9) $\quad I_A=I_0Ae^{-ax}+I_0(1-e^{-ax})$

(10) $\quad I_B=I_0Be^{-ax}+I_0(1-e^{-ax})$

Note: The form of the Equations 9 and 10 is obtained from Equations 4 and 5. The reason for using this form will be explained hereinafter in greater detail.

The Equation 7 may be rewritten as follows:

(11) $$V=\frac{I_B-I_A}{I_B}$$

or $$V=\frac{I_0Be^{-ax}+I_0(1-e^{-ax})-I_0Ae^{-ax}-I_0(1-e^{-ax})}{I_0Be^{-ax}+I_0(1-e^{-ax})}$$

or

(12) $$V=\frac{I_0Be^{-ax}-I_0Ae^{-ax}}{I_0Be^{-ax}+I_0(1-e^{-ax})}$$

(13) $$V=\frac{\text{Light from background}-\text{light from object}}{\text{Light from background}+\text{superimposed illumination}}$$

This is significant, since the value of V is really dependent on the value of the overlaid illumination. This becomes clear if there is removed therefrom the term $$[I_0(1-e^{-ax})]$$

and rewrite Equation 12 without it, thus:

(14) $$V=\frac{I_0Be^{-ax}-I_0Ae^{-ax}}{I_0Be^{-ax}}$$

The term $e^{-ax}$ for attenuation by the fog now comes out and there remains:

(15) $$V=\frac{I_0B-I_0A}{I_0B}$$

or V is independent of distance—an absurdity.

While the physical meaning of Equation 12 is most apparent in the form shown, it can, of course, be reduced for convenience to

(16) $$V=\frac{(B-A)e^{-ax}}{1-(1-B)e^{-ax}}$$

The value of V for visual cut off is of importance and while it may vary somewhat with individuals, it is certain that some value greater than zero exists. Tests indicate that a value of V of .05 is close to the cut off point.

Figure 6:
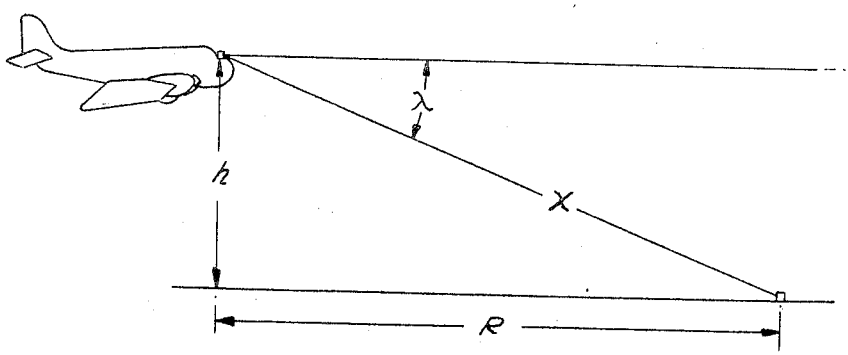
FIGURE 6 is a diagrammatic view illustrating that the visual distance through a fog indicated thereon as X is the slant range.

In common with prior methods of fog simulation, since there cannot be actual control of the fog simulation as a function of range, all functions are expressed in terms of angle. Refer to FIGURE 6. It is, of course, obvious that the visual distance through the fog, referred heretofore as $x$, is the slant range.

Now:

$$h/x = \sin \lambda$$

where $h$ = altitude and $\lambda$ = angle relative to horizon or

(17)
$$x = \frac{h}{\sin \lambda}$$

also, horizontal runway range (R)

(18)
$$R = \frac{h}{\tan \lambda}$$

The basic equations are expressed then in terms of terrain clearance $h$ and angle from the horizontal which is termed $\lambda$.

The expression for transmitted light Equation 4 becomes:

(19)
$$I_1 = I_0 A e^{\frac{-ah}{\sin \lambda}}$$

reflected or background illumination Equation 5 becomes:

(20)
$$I_2 = I_0 \left(1 - e^{\frac{-ah}{\sin \lambda}}\right)$$

and the expressions for visibility index Equations 8 and 16 become:

(21)
$$V = (1-A) e^{\frac{-ah}{\sin \lambda}}$$

(22)
$$V = \frac{(B-A) e^{\frac{-ah}{\sin \lambda}}}{1 - (1-B) e^{\frac{-ah}{\sin \lambda}}}$$

Figure 7:
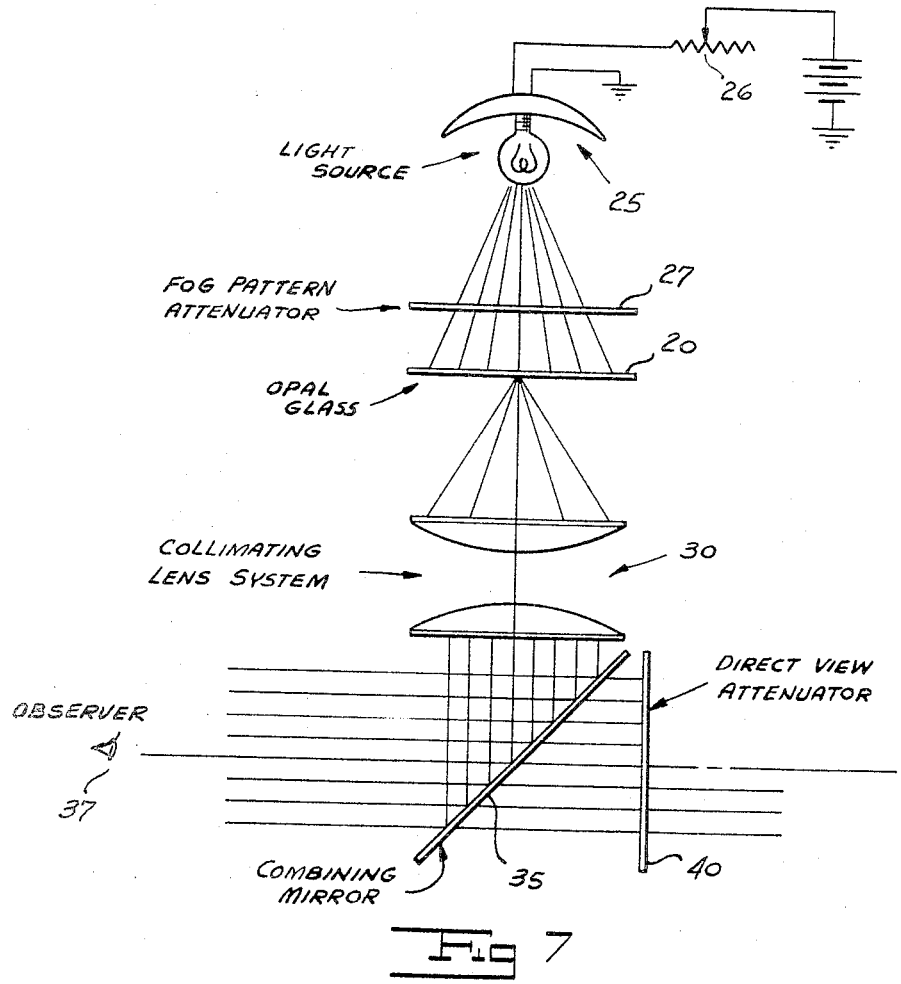
FIGURE 7 is an optical schematic view of a basic form of fog simulator embodying the present invention.
Figure 8:
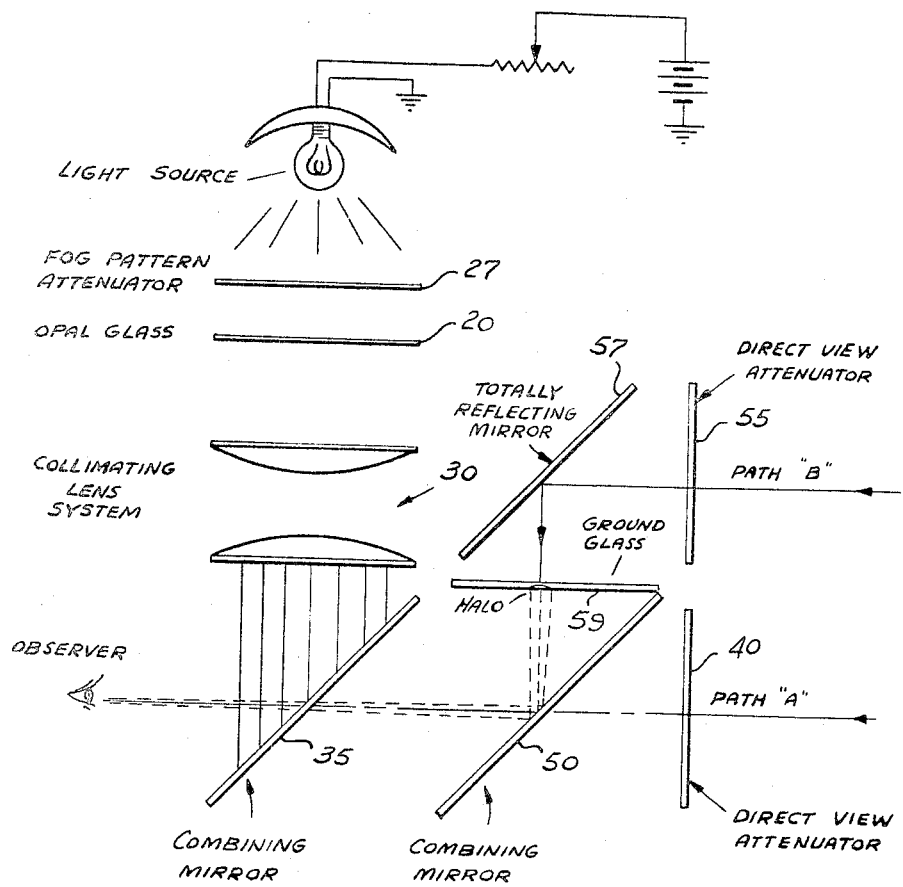
FIGURE 8 is an optical schematic view of a modified form of the fog simulator of FIGURE 7 and embodying a "halo" generator for simulating fog conditions at night.
Figure 9:
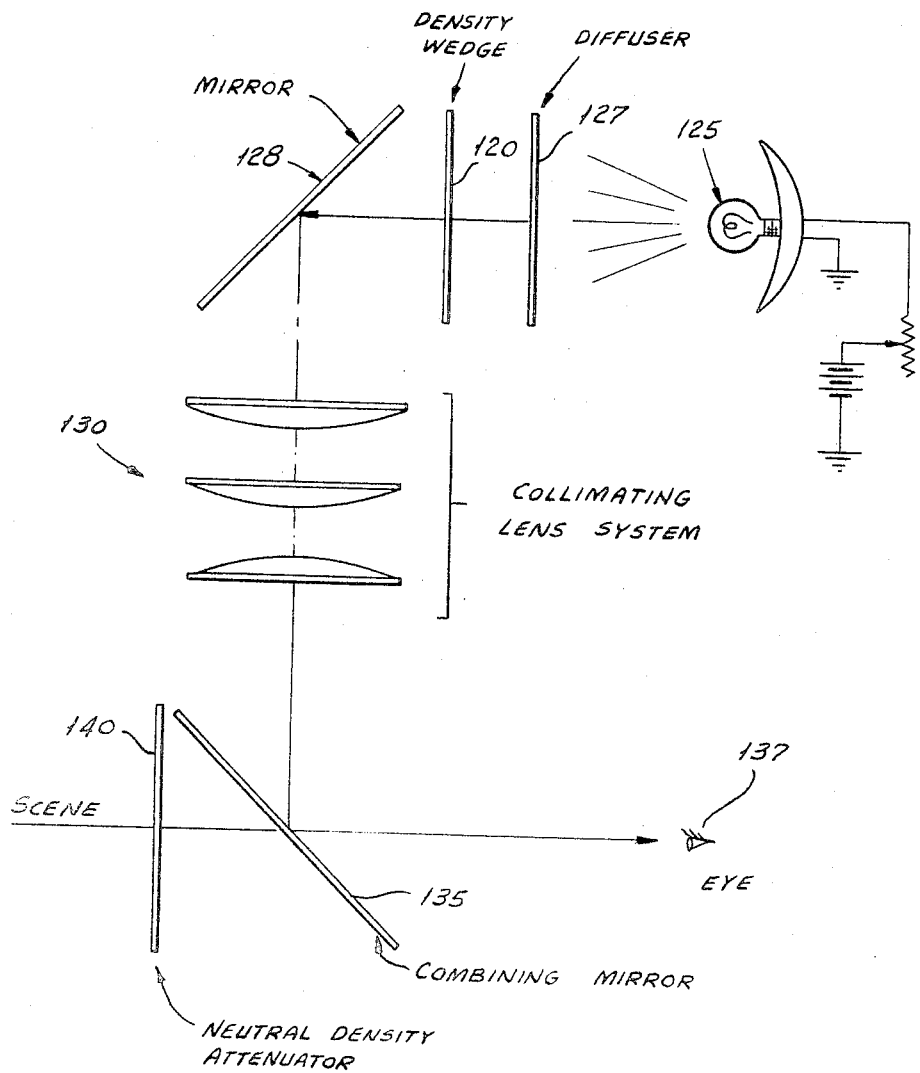
FIGURE 9 is an optical schematic view of a basic form of fog simulator embodying the present invention.

*Fog simulator of FIGURES 7, 8 and 9*

Before proceeding further it would be well to have a clear picture of the basic optical structure to be used to accomplish the purpose of the fog simulation of the present invention.

Referring then to the optical schematic view of the basic form of the fog simulator of FIGURE 7, it will be seen that in such device the functions of attenuating the direct view, and providing the background illumination are separated. In providing the means for producing the background illumination—"the fog"—there is provided a screen of opal glass or similar material indicated by the numeral 20, which is illuminated in such a fashion as to simulate the fog condition desired.

Figure 7A:
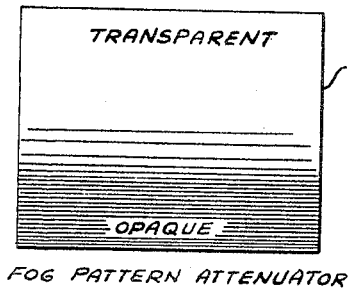
FIGURE 7A is a plan view of the fog pattern attenuator screen embodied in the optical system of FIGURE 7.

As shown by FIGURE 7, there is provided a simple light source 25 having an appropriate color temperature, and the energization and illumination of which light source 25 may be varied by the operator adjusting a suitable resistor 26. The light source 25 is combined with an attenuator screen or diffuser 27 containing the desired fog pattern, as shown by FIGURE 7A. The screen 27 is interposed between the light source 25 and the opal glass screen 20. Such illumination may, of course, be provided in many ways; such as, for example, by the use of natural light derived from the forward view through the windshield, or the use of a suitable projection device capable of providing movement to the illuminated area.

Further, as shown by FIGURE 7, the light rays from the opal glass or density wedge 20 are directed through a collimating lens system 30 to a combining mirror 35 which is of a partially transparent reflecting type, positioned in the pilot's line of sight. Through the combining mirror 35, the eye of the observer indicated by the numeral 37, sees a virtual image of the illuminated area superimposed on the visual scene at a great distance therefrom and seen through the direct view attenuator 40 as though the image of the illuminated area were a part of the scene. Within the limits of the optical system, as shown schematically by FIGURE 7, motions of the head of the observer cannot disturb its orientation relative to the ground, as the observer may not, for example, "peek" under it.

In the attenuation of the direct view, there may be used a form of telescope wherein a real image of the direct scene is formed. Such an image may in turn be collimated in a fashion similar to that just described at unity magnification and there may be further provided an attenuator screen at the plane of the real image to operate in strict register with the screen, as described and claimed in U.S. application Ser. No. 604,476 filed Dec. 23, 1966 by Paul A. Noxon, and assigned to The Bendix Corp., assignee of the present invention.

Figure 7B:
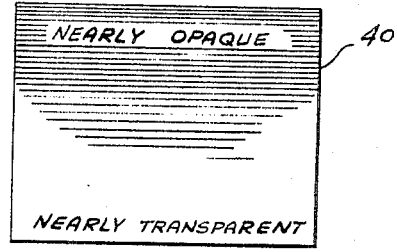
FIGURE 7B is a plan view of a direct view attenuator screen embodied in the optical system of FIGURE 7.

Moreover, instead of a screen 40 of a graded density, as shown by FIGURE 7B, of for example from nearly opaque at the top to nearly transparent on the bottom, it will be seen that, alternatively, an attenuator screen of uniform density across the visual sector can be employed; in which case the visual pattern is completely controlled by the pattern of illumination overlay provided by light source 25 and attenuator 27.

While the fog simulator, as described with reference to FIGURE 7, may substantially satisfy the requirements for the simulation of certain fog conditions in daytime use, it has been found desirable in the simulation of nighttime fog conditions that a "halo" of background illumination surrounding each light image from a land based light source be provided in order that there be provided a reasonable simulation of fog conditions found in night operation.

In the optical system, shown in FIGURE 8, there is provided novel means to effect this so-called halo of background illumination in the provision of a suitable ground glass screen 59. While such ground glass provides an excellent halo surrounding the light image from the land base light source when rays therefrom are directed through such a screen, it has been found that such a ground glass screen would provide poor or no undiffused direct light image.

In order to effect the desired result then, there is provided a second combining mirror 50, of a partially transparent reflecting type, interposed behind the direct view attenuator 40 of FIGURE 7, as shown by FIGURE 8, and serially arranged between the direct view attenuator 40 and the combining mirror 35. The light rays coming along the path B from the ground base light sources are then directed through a second direct view attenuator screen 55 and by a totally reflecting mirror 57 through the suitable ground glass screen 59, to the second combining mirror 50. The arrangement is such that the halo produced by the light rays (via path B) directed by the totally reflecting mirror 57 onto the ground glass screen 50 may then be superimposed about the direct view light image of each of the same ground base light sources as seen through the direct view attenuator 40 (via path A) from the ground base lights. Thus the halo from the light source rays applied along path B are superimposed on the direct view of the same ground base lights as viewed through path A.

It will be seen then that by use of a suitable ratio of transmission to reflection of the second combining mirror 50 plus an additional graduated attenuator screen 55 in path B, the relative intensity of the two images applied through the paths A and B, sharp and diffused, may be controlled as required.

Furthermore, by the aforenoted means, there has been separated and made subject to control the most important elements involved in the optical effects of the fog: (1) the general background illumination which has been collimated and placed in register with the real scene as provided by the optical system of FIGURE 7 and applied in the optical system of FIGURE 8; (2) the controlled attenuation of the direct view so that it may merge with the collimated background illumination, as provided in FIGURES 7 and 8; and (3) local illumination or halos to surround the land base light sources as seen directly through the combining mirrors 35, 50 and the direct view attenuator 40 and the optical system 55–59 cooperating therewith, as heretofore described with reference to FIGURE 8.

The fog simulator of FIGURE 9 embodies a further modification of the devices of FIGURES 7 and 8 in the provision of a neutral density attenuator or filter 140 having a density value of unity (10% transmission) and interposed in the line of sight of the eye 137 of the observer.

Through the provision of a combining mirror 135 in the line of sight of the observer and an optical system including a collimating lens system 130, a reflecting mirror 128, a density wedge 120 and a diffuser 127 cooperating with a light source 125, a virtual image at infinity of an illuminated pattern provided by the density wedge 120, is injected into the observer's line of sight.

This fog pattern is provided by a graduated density screen or wedge 120 uniformly illuminated by a source of light 125 which has a suitable color temperature.

Such a system provides at the observer's position 137, a substantially parallel bundle of rays emanating from a given front on the wedge 120. His head movements may not then appreciably affect the registration of the illuminating radiant with the outside visual panorama.

If there be assumed a stable datum (the aircraft body), the brightness of the overlaid illumination may be controlled at any light value relative to the angle that may be selected. Thus if the altitude of the aircraft above the ground and the level of the outside illumination be determined, there may be controlled the illumination ratio and hence, the visual cut off point at a desired range.

The means of accomplishing this as well as maintaining a reasonable simulation of fog conditions during the dynamics of the landing of an aircraft are discussed hereinafter with reference to the form of the fog simulator of FIGURES 14, 15 and 16.

*Method for simulating fog*
SPECIFIC DESIGN CONSIDERATIONS

There may be first examined the gradients of overlaid illumination which the fog simulator of the present invention may be called on to simulate. At this point, it must be recognized that there are various definitions of visibility in a fog which will not be discussed herein. Instead there is assumed a definition of the visibility in a fog which while not in accordance with any "standard" is close enough for the present purposes and is practicable to handle. The visual range for purposes of the present invention is defined then as the slant distance through a homogenous fog which yields a cut off value V of .05 when viewing an objecting having a reflectivity A of .10.

Figure 10:
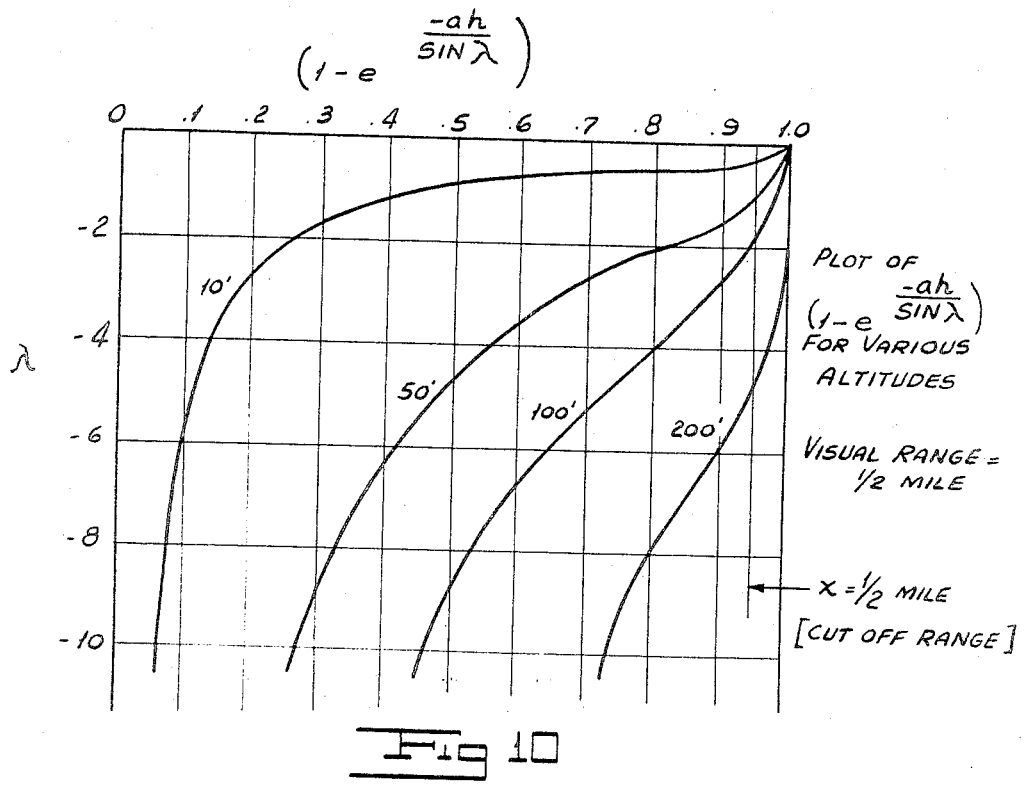
FIGURES 10 and 11 are graphical illustrations in which the coefficient for illumination overlay $$\left(1 - e^{\frac{-ah}{\sin \lambda}}\right)$$
Figure 11:
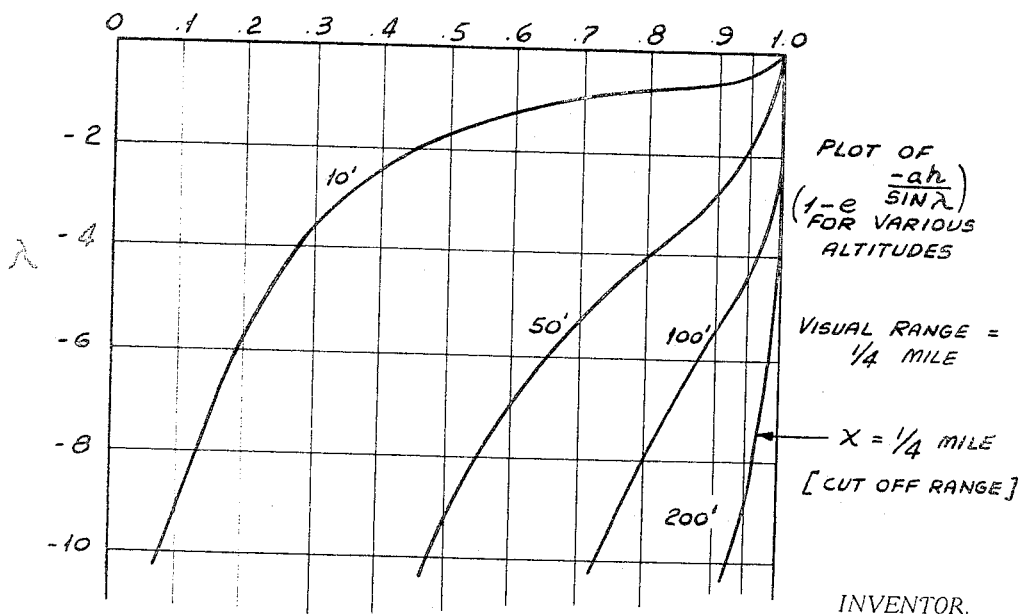

On this basis, there can be established the corresponding values of the fog density constant $a$ and there may be plotted the coefficient for illumination overlay $$\left(1 - e^{\frac{-ah}{\sin \lambda}}\right)$$

as a function of angle $\lambda$ for a number of altitudes (see FIGURES 10 and 11). A number of things are apparent.

(1) The gradient of brightness vs. angle $\lambda$ (and therefrom runway range) is, especially at the cut off distance, a strong function of altitude.

(2) This slope is so great at low altitudes (eg., 10′) that even a homogenous fog no doubt looks like a cloudbase situation.

(3) Altitude and fog density are surprisingly almost interchangeable terms. (Compare the curves for 50′ and 100′ altitude with cutoff at ¼ mile with the curves for 100′ and 200′ with cutoff at ½ mile.)

(4) Except for extremely low altitude (eg., 10′) these curves can be approximated reasonably well by straight lines.

It will be seen then that while the natural curves are nonlinear, a linear transmittance gradient may well be acceptable for the density wedge shown in FIGURE 9.

It is quite clear, however, from the foregoing that a *constant* density gradient of illumination overlay will not do. It *must* be programmed with altitude.

This can be accomplished by controlling the brightness of the light source illuminating the wedge element as shown graphically by FIGURE 12. Now, of course, it will be required to maintain the ratio of illumination provided by the simulator at a constant ratio with the ground illumination level at the cut off angle as the altitude changes. There must, therefore, be provided means to maintain this brightness level regardless of requirements for gradient. This is effected by providing mirrors of a partially transparent reflecting type as at 128A and 128B of FIGURE 14, and illuminating them from behind in a uniformily distributed manner, as by the mirror lamps 150 of FIGURE 14. Such a background combined with the proper gradient from the wedge 120 can supply almost any required distribution. See FIGURE 13. Except for extremely low altitude, little compromise with the natural distribution need be made. It will be further noted from the foregoing that the following conditions are also evident:

(1) A uniform illumination overlay such as provided by illuminating mirrors 128A and 128B of FIGURE 14, from the rear need not be collimated, since there is no effect produced by changing the observer's direction of view or eye position.

(2) The sky area brightness or constant ambient intensity may be termed $I_0$. Some liberties may be taken with this since the natural situation is extremely variable in this as well as other features of the brightness distribution. The linear curve may therefore be carried 1 or 2 degrees above the horizon to permit a simple approach to pitch attitude compensation, as will be explained hereinafter in greater detail.

There may now be considered the means by which all this may be accomplished, as shown in detail in FIGURES 14 and 15.

*Fog simulator of FIGURES 14 and 15*

Referring now to the optical system of FIGURE 14, there has been indicated by like numerals corresponding parts to those heretofore explained with reference to FIGURE 9. However, in the form of the optical system of FIGURE 14, the system of FIGURE 9 has been augmented not only by the use of partially transparent semi-reflecting mirrors, 128A and 128B, but also by the addition use of the illuminating lamps 150 for the semireflecting mirrors 128A and 128B, as well as the wedge lamp 125. There are also provided two photosensitive devices or photocells A-1 and A-2 associated with the mirror lamps 150 and two photosensitive devices or photocells B-1 and B-2 associated with the wedge lamp 125. In addition, there is further provided a fifth photosensitive device or photocell C so positioned as to sense the ambient light beneath the aircraft bearing the fog simulator.

The photosensitive devices or photocells A-1, A-2, B-1, B-2 and C may be photoconductor devices which exhibit a change in resistance with the light rays striking the devices, such as selenium resistance devices having an electrical resistance which decreases with the intensity or the amount of light striking the selenium surface.

In place of the fifth resistance photo cell C there may be selectively connected into the network by an operator controlled switch 151 a simple manually adjustable variable resistance element 153 so as to provide an electrical resistance in the arm of a bridge controlled thereby and corresponding to the resistance of the photocell C to effect an appropriate light and value setting for the fog simulator of FIGURES 14 and 15.

Referring now to the graphical illustration of FIGURE 13, it will be seen that the slope of illumination or gradient may be most effectively handled by controlling the ratio of light furnished by the wedge lamp 125 to that of the light furnished by the mirror lamp 150. Also, it is necessary to control the total value of illumination effected by the lamps 125 and 150 so as to maintain the ratio of this total value of illumination to ground brightness such that a ratio of .05 is maintained at the angle λ corresponding to the selected slant range X. This means that both the ratio of the light furnished by the wedge lamp 125 to the light furnished by the mirror lamp 150, as well as the total brightness furnished by both these lamps 125 and 150 must be programmed with the altitude of the aircraft above the terrain and compensated for the pitch attitude of the aircraft in flight.

Referring now to FIGURE 15, the electrical network of the computer structure effecting the foregoing operation may be readily seen. In the computer network, the photo cells A–1 and B–1 associated with the mirror lamp 150 and the wedge lamp 125, respectively, are connected in a bridge network 155, having variable resistance ratio arms 157 controlled by an altitude responsive output shaft 159 which may be adjustably positioned by an air data computer system 161 which senses the prevailing altitude of the aircraft to vary the resistance of the arms 157 in accordance therewith and variable resistance ratio arms 158 also controlled through altitude responsive output shaft 159 to vary the resistance of the arms 158 so as to provide a control of the density of the simulated fog that is variable with the prevailing altitude of the aircraft.

A suitable source of electrical energy, or battery 163, is connected by conductors 161 and 162 across the bridge network 155 and the arrangement is such that upon the resistances of the photocells A–1 and B–1 being so adjusted by the intensity of the light supplied by the mirrow lamps 150 and the wedge lamps 125 in relation to the variable ratio arms 157 and 158 as to balance the bridge network 155, there will be no electrical output applied by the battery 163 through the bridge network 155 to the output lines 165 and 167.

However, upon the light sensed by the photocells A–1 and B–1, or the adjustment of the variable resistance ratio arms 157 and 159, being such as to unbalance the bridge network 155, there will be applied by the battery 163 through the bridge network 155 and across the output lines 165 and 167, a direct current signal of a potential and amplitude dependent upon the sense and magnitude of the unbalanced relation of the bridge network 155. This direct current signal is then applied through output conductor 165 to the input of a direct current amplifier 169 of conventional type and through an output conductor 170 from the amplifier 169, to provide a direct current electrical signal to drive a DC motor 171 in a conventional manner and in a direction dependent upon the sense of the unbalance of the bridge circuit 155.

Because of the unbalanced bridge network 155, the motor 171 then drives through an output shaft 172 a differential gear train 175 so arranged as to drive through a shaft 177 an arm of a potentiometer 179, while driving through shaft 185 in an opposite sense an arm of a potentiometer 187. The potentiometer 179 controls the energization by a battery 180 of the lamp 125 while the potentiometer 187 controls the energization by a battery 188 of the lamp 150 and as operated through the differential gear train 175 the motor 171 drives one of the potentiometers to increase the illumination of one of the lamps while driving the other of the potentiometer in an opposite sense to decrease the illumination of the other lamp so as to vary the ratio of the illumination of the lamps 125 and 150 to balance the bridge network 155. The relative movement of the respective gearing and controls for the potentiometers 179 and 187 has been indicated by solid arrows in this differential mode of operation. It will be seen that the motor 171 dependent upon the sense of the unbalance of the bridge 155, will act to control the ratio of the illumination of the lamps 125 and 150 so that one is brightened and the other dimmed to effect a variance in the resistance of the two photocells A–1 and B–1 in a sense to balance the bridge 155.

Further, to effect the brightness control of the lamps 125 and 150, the other variable resistance cells A–2 and B–2 associated with the lamps 150 and 125, respectively, are connected in series in one arm of a bridge network 201, including in opposite arms the brightness control variable resistance arms 203, also controlled by the altitude responsive output shaft 159, and in another arm the variable resistor 153 or photocell C responsive to the ambient light beneath the aircraft and in series therewith the variable resistance arms 205 which are adjusted, as thereinafter explained, to compensate the simulated fog for changes in the pitch attitude of the aircraft with changes in the prevailing altitude, while the battery 163 is connected across the bridge 203 by the conductors 161 and 162.

Thus the sum of the series connected variable resistance photocells A–2 and B–2 is compared in the bridge network 201 with the resistance of the bridge arms including the variable resistance arms 203 controlled by the output shaft 159 of the altitude responsive device 161, the variable resistance arms 205 controlled by the output shaft 207 of an aircraft pitch responsive vertical gyroscope 209 and the altitude responsive output shaft 159 and with the resistance of resistor 153 or photocell C responsive to the ambient ground illumination, as heretofore explained.

The photo resistances A–2 and B–2 connected in series and responsive to the brightness of the lamps 150 and 125, thus have the sum of their resistances compared in the bridge network 201 with the resistance of resistor 153 or photocell C. The arrangement is such then that an unbalance of the bridge 201 causes a direct current signal to be applied by battery 163 across the bridge output conductors 217 and 221 having a potential and amplitude dependent upon the sense and magnitude of the bridge unbalance.

The output conductor 217 leads directly to the input of a second direct current motor 215 while the output conductor 221 is connected to the input of a conventional DC amplifier 223 and through output conductor 225 leading from the amplifier 223 to another input terminal of the DC motor 215.

The motor 215 is controlled then by the bridge network 201 so as to drive through an output shaft 217 in a direction dependent upon the unbalance sense of the bridge network 201 and through a gear train 175 so as to position the arms of potentiometer 179 and 187 in a like sense to increase or decrease the illumination of both lights 125 and 150 dependent upon the sense of the unbalance of the bridge 201 and thereby decrease or increase, respectively, the resistance of the series connected light sensitive photocells A–2 and B–2 to balance the bridge 201. The relative movements of the respective gearing and controls for the potentiometers 179 and 187 has been indicated by dotted arrows in this last mode of operation.

Inasmuch as the correct ratio of illumination of the respective lamps 125 and 150, as well as the level of illumination thereof must be maintained in accordance with a predetermined program dependent upon the angle of pitch of the aircraft at the prevailing altitude, an open loop program of altitude to pitch control of the bridge network 201 is effected through adjustable resistance arms 203, as well as the adjustable resistance arms 205, including the arm of a variable resistor 230 controlled by shaft 207 driven by the vertical gyro pitch sensor 209 of the altitude system and the adjustable arms of the variable resistor 231 and 233 positioned by shaft 159 operated by the device 161 in response to the prevailing atmospheric pressure or altitude level of flight of the aircraft.

As previously observed, fog density and altitude are practically interchangeable terms as far as the brightness gradients of the fog simulator are concerned. Thus in the fog simulator of the present invention there is provided in the bridge network 155 the adjustable resistance arms 158 arranged to be adjusted by the shaft 159 from the altitude sensor device 161 so as to program the fog simulator or density of the simulated fog with changes in the prevailing altitude of the aircraft to more accurately simulate the fog conditions which might actually prevail in the flight of the aircraft with changes in the altitude thereof or as the aircraft descends through a fog.

The use of linear gradients makes possible a limited compensation in the simulated fog for the pitch attitude of the aircraft, by modulating the brightness of the fog simulation as a function of the pitch attitude as sensed by the vertical gyro 209 and the adjustment of the variable resistor 230 through the output shaft 207 in such a way that there is maintained a brightness of the simulated fog at the correct pitch angle of the aircraft relative to the horizontal which corresponds to the prevailing altitude of the aircraft. The graphical showing of FIGURE 13 illustrates that the gain of the operation in the fog simulation for changes in the pitch attitude of the aircraft must be programmed with the prevailing altitude of the aircraft.

In the computer network shown by FIGURE 15, this result is accomplished by means of variable resistors 231 and 233 operating in response to the prevailing altitude of the aircraft and cooperatively arranged in relation to the variable resistor 230 operated in response to the pitch sensor device 209 to provide the desired control of the simulated fog condition which is programmed in accordance with the prevailing altitude as modified by the pitch attitude of the aircraft.

Furthermore, by the provision of suitable operator-operative switching devices 240, 242, 245, the values of the several resistors 157, 158 and 203 in the arms of the bridge networks 155 and 201 may be readily selected, as shown by the wiring diagram of the computer network of FIGURE 15, so that predetermined fog simulation programs may be provided in the fog simulator and selected by the operator as desired. Thus homogenous, cloud base, and "hook fog" conditions may be simulated by appropriate selective operation of the switching means 240, 242 and 245. Any desired number of the fog simulated programs may be provided and readily selected by the operator.

Moreover, while the fog simulation system aforedescribed is based upon the mathematics of a daytime fog, the same may be operated under relative low light level conditions providing only that the land based runway lights viewed are not sufficiently bright to exceed the cut-off ratio.

*Operation of the fog simulator of FIGURES 14 and 15*

In the operation of the fog simulator of FIGURES 14 and 15, initially the air data computer 161 is adjusted by the operator through conventional means to the altitude of the aircraft relative to the ground at the start of the landing operation while the manually operable switch 151 is so set as to selectively connect into the control network either the variable resistor 153 or the photocell C responsive to ground brightness.

In either case, the adjusted resistance of the resistor 153 or the resistance of the photocell C is such as to provide that the ratio of the total value of the illumination effected by the lamps 125 and 150 to the ground brightness approximates a value of .05 at the angle corresponding to the selected slant range X at the start of the approach of the aircraft to the landing operation, as shown by FIGURE 6.

In other words, the illumination setting is such that the combined illumination indicated by lines X and Y of FIGURES 13 have the proper brightness compared to the outside illumination to achieve cut off at the angle corresponding to the selected range, for example, one quarter of a mile, as shown graphically by FIGURE 13.

Thereafter, as the altitude of the aircraft decreases in effecting the landing of the aircraft, the output shaft 159 of the air data computer is angular positioned, in for example a counterclockwise direction, so as to position the arms of the ratio programmer 157, brightness control 203, fog density control 158, and pitch attitude compensator 205, as hereinafter explained.

The positioning of the arms of the ratio programmer 157 in a counterclockwise direction upon a decrease in the altitude of the aircraft acts in a sense to unbalance the bridge 155 so as to effect rotation of the ratio actuator 171 in a direction to cause resistor 179 to be adjusted in a resistance decreasing sense to increase energization and thereby illumination of the wedge lamp 125 while resistor 187 is adjusted in an opposite resistance increasing sense to decrease the energization thereof and thereby illumination of the mirror lamp 150. This in turn, will be sensed by the mirror light photocell A-1 to increase the resistance thereof, while the resistance of the wedge lamp photocell B will be decreased, both acting in a sense to balance the bridge 155.

Thus, as the aircraft decreases for example from the 200 feet level to the 10 feet level, the brightness of the wedge lamp 125, as indicated by the line X of FIGURE 13, is increased while the brightness of the mirror lamp 150, as indicated by the line Y of FIGURE 13, is decreased in relation one to the other to simulate the visual fog conditions encountered in the aircraft descending through a fog. Of course, an increase in the altitude of the aircraft would cause an opposite effect to simulate the visual fog conditions encountered upon the aircraft ascending through a fog by causing a decrease in the brightness of the wedge lamp 125 and a relative increase in the brightness of the mirror lamp 150.

Similarly with a decrease in the sensed altitude of the aircraft, the output shaft 159 will angularly adjust the arms of the brightness control 203 in a counterclockwise direction so as to unbalance the brightness control bridge network 203 in a sense predetermined by the program provided in the selected potentiometer 203, by means well known in the art, to cause the brightness actuator motor 215 to position the variable resistors 179 and 187 so as to act in a sense to increase or decrease the brightness of both the wedge lamp 125 and the mirror lamp 150 in a like sense to effectuate the correct brightness in cooperation with the ratio programmer 157, as set forth graphically for example in FIGURE 13.

An increase in the sensed altitude would effect an opposite change in the brightness of the wedge lamp 125 and mirror lamp 150, as predetermined by the program of the selected potentiometer 203. The mirror lamp photocell A-2 and the wedge lamp photocell B-2 are serially connected and the resistance thereof decreases with an increase in the illumination of the lamps 150 and 125 while the resistances of the photocells A-2 and B-2 increase with a decrease in the illumination of the lamps 150 and 125 so as to act in a sense to rebalance the bridge network 201.

However, in the case of the fog density control 158 it will be seen that in the event the programmed fog selected is that of a homogenous fog condition and for which the graphs of FIGURES 11, 12 and 13 were prepared, the selected resistor 158A will be set at a fixed value and will not be varied with change in the altitude of the aircraft, since in the case of such a homogenous fog, the density will not vary with the altitude of the aircraft. However, in the event the fog condition selected is that of a cloud base or hook fog, the density would, of course, vary with the altitude of the aircraft and in a predetermined fashion, as programmed by one or the other of the selected potentiometers 158, the resistance values of which will be varied by the angular position of the shaft 159 with the decrease in altitude so as to unbalance the ratio program network 155 in a sense to cause operation of the ratio actuator motor to increase or decrease the illumination of the wedge lamp 125 in relation to a corresponding decrease or increase of the brightness of the mirror lamp 150 as predetermined by the program built into the selected potentiometer 158 in a manner well known in the art.

Now in the operation of the pitch attitude compensation network 205 upon a small incremental change in the pitch attitude of the aircraft as in a pitch upward sense, the resistance 230 as indicated by the arrow will be decreased to effectively unbalance the bridge network 201 in a sense to cause the brightness actuator motor 215 to be driven in a sense to increase the energization and thereby the brightness of both the wedge lamp 125 and the mirror lamp 150 which will in turn effect a decrease in the resistance of the light sensitive photocells A–2 and B–2 acting in a sense to rebalance the bridge network 201.

Similarly, upon a change in the pitch attitude of the aircraft in a pitch downward direction the resistance 230 will be adjusted in an opposite sense so as to be increased to cause the bridge 201 to be unbalanced in a sense to cause the brightness control actuator motor 125 to be driven in an opposite sense to decrease the brightness of the lamps 125 and 150 which will in turn effect the resistance of the photocells B–2 and A–2 so as to rebalance the bridge 201.

The variable potentiometers 231 and 233 are angularly adjusted by the shaft 159 upon a decrease in the altitude of the aircraft as indicated by the arrows in a sense to decrease the resistance of resistor 231 while acting so as to decrease the shunting effect of potentiometer 233 on the resistor 230 and thereby act to increase the effectiveness of resistor 230 with decrease in the altitude of the aircraft. However, upon an increase in the effective altitude of the aircraft there will result an opposite effect in that the shaft 159 will then be adjusted to increase the resistance of resistors 231 while increasing the shunting effect of the potentiometer 233 on resistor 230.

The resistors 230, 231 and 233, as thus operated, provide the required change in the increment of the brightness to compensate for a given amount of change in the pitch attitude of an aircraft as predetermined by an illumination gradient corresponding to a given altitude, as shown graphically in FIGURE 13, in which the slopes of the altitude lines, for example 10 feet, 50 feet, 100 feet and 200 feet, progressively increase with increase in altitude.

Further, the ground brightness control or photocell C decreases in resistance with increase in the average ground brightness to in turn unbalance the bridge 201 in a sense to cause the brightness actuator motor 215 to increase the energization and thereby brightness of both the wedge lamp 125 and mirror lamp 150 in response thereto. A decrease in the sensed average ground brightness will cause an unbalancing of the bridge 201 in an opposite sense to cause a decrease in the brightness of the lamps 125 and 150.

The totality of effect then of the control system is to provide visual display means to simulate various fog conditions encountered in the flight of an aircraft, particularly in the descending of an aircraft through a fog to effect a landing operation and which fog conditions may be selectively programmed by the operator appropriately positioning the selector control switches 240, 242, and 245.

Fog simulator of FIGURE 16

Experience has shown that an illumination pattern under nighttime fog conditions may consist of halos surrounding each of the viewed land based runway lights and due to which these land based runway lights may or may not be seen depending upon the cut off ratio pertaining to the situation. Such halos may overlap when viewing an array of lights at a distance, and when near the ground, provide a general illumination overlay somewhat like day conditions. It will be seen then, that provided a suitable means may be devised to produce halos around the lights as viewed and to program the attenuation of the direct view, that gradients can in addition be supplied by the method heretofore described to produce a very good simulation of the fog conditions that may be encountered under aircraft flight conditions at night.

A modified form of the invention to effect a simulation of the fog conditions encountered in night flying is shown diagrammatically in FIGURE 16. In effecting this simulation, the simulation of a halo around each of the land based runway lights, seen by the observer, may be effected by employing a second combining mirror M–2 shown in FIGURE 16, and by means of which the observer views the surface of a ground glass screen S.

This screen, S, is illuminated from behind by light from each external ground based light source arriving via path A and a third (totally reflecting) mirror M3. Thus, there will be reproduced a spotlight or a halo for each light. The observer indicated by the letter O may also see the light from the land based runway lights directly via path B. Since the sources of light from the land based runway lights are relatively very far away, paths A and B are parallel—hence the halo provided by screen S, as viewed through the combining mirrors M–1 and M–2, will surround each of the lights as seen by the observer in a realistic manner, and there is no need for collimating lenses.

In order to attenuate the direct view there may be employed an electrooptical control indicated by the letter V, and which by means of conventional polarization techniques, may effectively control the density of the simulated fog through a wide dynamic range by the application thereto of an A.C. control voltage in a conventional manner. Such an electrooptical control V may be placed in the direct path and its attenuation programmed as a function of altitude by a suitable computer C, as heretofore explained. A typical electrooptical control that may be utilized for the control V may be obtained from the Marks Polarize Corporation and sold under the tradename of Varad.

While several embodiments of the invention have been illustrated and described, various changes in the from and relative arrangements of the parts, which will now appear to those skilled in the art may be made without departing from the scope of the invention. Reference is, therefore, to be had to the appended claims for a definition of the limits of the invention.

What is claimed is:

1. In an aircraft, a display apparatus for visually simulating fog on a visual scene to be viewed by an observer in the aircraft, comprising first means for producing a collimated fog pattern, and second combining means for spatially superimposing the collimated fog pattern on the visual scene as viewed by the observer so as to simulate visual fog conditions during flight of the aircraft, the first means for producing a collimated fog pattern including a fog pattern attenuator, means for supplying light to illuminate the fog pattern attenuator, a collimating lens system, a light density wedge between the fog pattern attenuator and the collimating lens system for directing light through the collimating lens system to the combining means, the last mentioned means combining the fog pattern produced by illumination of the fog pattern attenuator with the visual scene as viewed by the observer through the combining means, and operator-operative means to vary the light supply means and thereby the illumination of the fog pattern attenuator so as to change the light density of the fog pattern image produced on the combining means.

2. In an aircraft, a display apparatus for simulating visual fog conditions, comprising an optical system to separately produce a fog pattern image and a direct view image, and means for combining the separately produced fog pattern image and direct view image for viewing so as to simulate visual fog conditions during flight of the aircraft, the optical system including a reflecting mirror, a ground glass screen, a second combining means, the reflecting mirror being arranged to direct a light image of a direct view light source so as to illuminate the ground glass screen to produce therethrough an image of a halo of light applied to the screen combining means, the last mentioned second means combining the separately produced direct view light image with the image of the halo of light produced by the illumination of the ground glass screen, and the second combining means being serially arranged in relation to the other of said combining means so that the combined image of the halo of light and direct view light image may be viewed through the other of said combining means with the separately produced fog pattern image superimposed thereon.

3. In an aircraft, a display apparatus for visually simulating fog on a visual scene to be viewed by an observer in the aircraft, comprising first means for producing a collimated fog pattern, and second combining means for spatially superimposing the collimated fog pattern on the visual scene as viewed by the observer so as to simulate visual fog conditions during flight of the aircraft, the first means for producing a collimated fog pattern including a light diffuser, a light source cooperating with the light diffuser, a graduated density screen uniformly illuminated by the source of light through the light diffuser to produce a fog pattern, a collimating lens system, and a reflecting mirror directing light rays from the illuminated graduated density screen through the collimating lens system to the combining means, the last mentioned means combining the fog pattern produced by the illumination of the graduated density screen with the visual scene as viewed by the observer through the combining means.

4. The combination defined by claim 3 in which the reflecting mirror is of a partially transparent type having a partially reflecting surface, a source of light for illuminating an opposite surface of the partially reflecting mirror, means for controlling the illumination of the density screen, and other means for controlling the illumination of the partially reflecting mirror so as to vary the fog pattern and background illumination of the fog pattern superimposed at the combining means for viewing with the visual scene as viewed by the observer through the combining means.

5. In an aircraft, a display apparatus for visually simulating fog on a visual scene to be viewed by an observer in the aircraft, comprising first means for producing a collimated fog pattern including variable light source means, and means to control the variable light source means to vary the collimated fog pattern, and second combining means for spatially superimposing the collimated fog pattern on the visual scene as viewed by the observer so as to simulate visual fog conditions during flight of the aircraft, means responsive to changes in prevailing flight conditions of the aircraft to operate the means to control the variable light source means for varying the collimated fog pattern to be viewed by the observer with the visual scene at the combining means so as to simulate changes in the visual fog conditions upon such changes in the prevailing flight conditions of the aircraft.

6. A display apparatus as defined by claim 5 in which the means responsive to changes in said flight conditions includes means effective upon changes in prevailing altitude of the aircraft in flight to operate the means to control the variable light source means for varying the collimated fog pattern to be viewed by the observer with the visual scene at the combining means so as to simulate changes in the visual fog conditions upon such changes in the prevailing altitude of the aircraft in flight.

7. A display apparatus as defined by claim 5 in which the means responsive to changes in said flight conditions includes aircraft attitude responsive means effective upon changes in the attitude of the aircraft in flight to operate the means to control the variable light source means for varying the collimated fog pattern to be viewed by the observer with the visual scene at the combining means so as to simulate changes in the visual fog conditions upon such changes in the attitude of the aircraft in flight.

8. A display apparatus as defined by claim 5 in which the means responsive to changes in said flight conditions includes aircraft pitch attitude responsive means effective upon changes in the pitch attitude of the aircraft in flight to operate the means to control the variable light source means for varying the collimated fog pattern to be viewed by the observer with the visual scene at the combining means so as to simulate changes in the visual fog conditions upon such changes in the pitch attitude of the aircraft in flight.

9. In an aircraft, a display apparatus for visually simulating fog on a visual scene to be viewed by an observer in the aircraft, said display apparatus comprising means for producing a collimated fog pattern including a variable light source means, means for combining the collimated fog pattern on the visual scene as viewed by the observer, means for controlling the fog pattern including first means responsive to changes in prevailing altitude of the aircraft in flight to control the variable light source means, second means responsive to changes in pitch attitude of the aircraft to control the variable light source means, and said first and second means being thereby effective to control the variable light source means in response to said changes to vary the collimated fog pattern to be viewed by the observer with the visual scene at the combining means so as to simulate changes in the visual fog conditions upon such changes in the altitude and attitude of the aircraft in flight.

10. A display apparatus as defined by claim 9 including other means operative by the first means in response to the changes in the prevailing altitude of the aircraft in flight to vary the effect of said second means on the collimated fog pattern dependent upon the prevailing altitude of the aircraft in flight.

11. A display apparatus as defined by claim 9 including other means operative by the first means in response to the changes in the prevailing altitude of the aircraft in flight to increase the effect of said second means on the collimated fog pattern upon a decrease in the prevailing altitude of the aircraft in flight.

12. In an aircraft, a display apparatus for simulating visual fog conditions, comprising an optical system to separately produce a fog pattern image and a direct view image, and means for combining the separately produced fog pattern image and direct view image for viewing so as to simulate visual fog conditions during flight of the aircraft, the optical system including a first direct view attenuator, a reflecting mirror, a ground glass screen, a second combining means, the reflecting mirror being arranged to direct a light image applied through the first direct view attenuator from a ground based light source so as to illuminate the ground glass screen and produce therethrough an image of a halo of light applied to the second combining means, a second direct view attenuator through which the ground based light source may be viewed through the second combining means, the last mentioned second means combining the image of the halo of light in a superimposed relation about the ground based light source viewable therethrough, and the second combining means being serially arranged in relation to the other of said combining means so that the combined halo of light and the ground based light source may be viewed through the other of said combining means with the separately produced fog pattern image superimposed thereon.

13. In an aircraft, a display apparatus for simulating visual fog conditions, comprising an optical system to separately produce a fog pattern image and a direct view image, and means for combining the separately produced fog pattern image and direct view image for viewing so as to simulate visual fog conditions during flight of the aircraft, the optical system including a fog pattern attenuator, means for supplying light rays to illuminate the fog pattern attenuator, a collimating lens system between the fog pattern attenuator and the combining means, a first direct view attenuator, a reflecting mirror, a ground glass screen, a second combining means, the reflecting mirror being arranged to direct a light image applied through the first direct view attenuator from a ground based light source so as to illuminate the ground glass screen and produce therethrough an image of a halo of light applied to the second combining means, a second direct view attenuator through which the ground based light source may be viewed through the second combining means, the last mentioned second means combining the image of the halo of light in a superimposed relation about the ground based light source viewable therethrough, and the second combining means being serially arranged in relation to the first mentioned combining means so that the combined image of the halo of light and the ground based light source may be viewed through the first mentioned combining means with the fog pattern image produced by the illumination of the fog pattern attenuator superimposed thereon.

14. A method for providing in an aircraft during flight an airborne simulation of visual fog conditions, comprising the steps of providing a direct view of a visual scene viewable by an observer in the aircraft, illuminating a simulated fog pattern, combining light rays from the illuminated fog pattern with the direct view of the visual scene so as to simulate visual fog conditions during flight of the aircraft, sensing variations in flight conditions of an aircraft, varying the illumination of the simulated fog pattern with the sensed variations in the flight conditions of the aircraft so as to vary the airborne simulation of the visual fog conditions to provide a visual illusion of flight in the aircraft through the simulated fog.

15. A method for providing in an aircraft during flight an airborne simulation of visual fog conditions, comprising the steps of providing a direct view of a visual scene viewable by an observer in the aircraft, illuminating a simulated fog pattern, providing a background illumination, combining the light rays from the illuminated fog pattern with the light rays from the background illumination, collimating the light rays from the illuminated fog pattern together with the background light rays, directing the collimated light rays as a veil of light into a field of view of the visual scene, sensing variations in altitude of the aircraft in flight, and varying the ratio and brightness of the fog pattern and background illuminations with the sensed variations in altitude of the aircraft in flight so as to vary the airborne simulation of the visual fog conditions to provide a visual illusion of flight through the simulated fog.

16. The method defined by claim 15 including the steps of modulating the brightness of the simulated fog pattern illumination with pitch attitude of the aircraft, and modifying the last mentioned step dependent upon the altitude of the airborne simulation so as to maintain a predetermined relationship of the resulting visual fog pattern which varies with the pitch and altitude of the airborne simulation.

17. The method of providing an airborne simulation of visual fog conditions as defined by claim 16 including the steps of selectively programming both the ratio and brightness of the fog pattern and background illuminations dependent upon the predetermined visual fog pattern conditions to be simulated.

18. A method for providing in an aircraft during flight an airborne simulation of visual fog conditions, comprising the steps of providing a direct view of a visual scene viewable by an observer in the aircraft, illuminating a simulated fog pattern, sensing ground brightness at the level of the airborne simulation, and varying the total fog pattern illumination so as to maintain the fog pattern illumination at a predetermined ratio of the sensed ground brightness, and combining light rays from the illuminated fog pattern with the direct view of the visual scene so as to simulate visual fog conditions during flight of the aircraft.

19. The method of providing an airborne simulation of visual fog conditions as defined by claim 17 including the steps of sensing ambient light conditions at the level of the airborne simulation, varying the total value of the fog pattern and background illuminations so as to maintain the total illumination value thereof at a predetermined ratio of the value of the sensed ambient light in an airborne simulation of visual fog conditions during a landing operation along a selected slant range.

20. In an aircraft, a display apparatus for visually simulating fog on a visual scene to be viewed by an observer in the aircraft, said display apparatus comprising first means for producing a collimated fog pattern including an electric lamp, second means for varying illumination of the lamp, a normally balanced bridge network for controlling the second means, and said bridge network including third means responsive to flight conditions of the aircraft for unbalancing the bridge network to effect operation of the second means and thereby vary the illumination of the lamp and the resulting fog pattern produced by the first means, and light sensitive means responsive to the illumination of the lamp to rebalance the bridge network in response to the variance in the illumination thereof; and combining means for spatially superimposing the collimated fog pattern on the visual scene as viewed by the observer so as to simulate visual fog conditions during flight of the aircraft.

21. A display apparatus as defined by claim 20 in which the third means includes means responsive to changes in altitude of the aircraft for controlling the operation of the second means and thereby the illumination of the lamp and the resulting fog pattern produced by the first means in accordance with a predetermined program of illumination of the lamp.

22. A display apparatus as defined by claim 20 in which the third means includes means responsive to pitch attitude of the aircraft for controlling the operation of the second means and thereby the illumination of the lamp and the resulting fog pattern produced by the first means in accordance with a predetermined program of illumination of the lamp.

23. A display apparatus as defined by claim 20 in changes in altitude of the aircraft, other means responsive to changes in the pitch attitude of the aircraft, and both said altitude responsive means and said pitch attitude responsive means being operably connected in said bridge network for controlling the operation of the second means and thereby the illumination of the lamp and the resulting fog pattern produced by the first means in accordance with a predetermined program of illumination of the lamp.

24. A display apparatus as defined by claim 20, in which the bridge network includes an ambient light responsive means for controlling operation of the second means and thereby the illumination of the lamp and the resulting fog pattern produced by the first means in accordance with prevailing ambient light intensity.

25. In an aircraft, a display apparatus for visually simulating fog on a visual scene to be viewed by an observer in the aircraft, said display apparatus comprising first means for producing a collimated fog pattern, means for combining the collimated fog pattern on the visual scene as viewed by the observer, said first means including a fog pattern attenuator, a first lamp for illuminating the fog pattern attenuator, a second lamp for providing a background illumination, means for combining light rays from the fog pattern attenuator with light rays from the background illumination and directing the combined light rays to the means for combining the collimated fog pattern on the visual scene as viewed by the observer, first control means for varying the illumination of the first lamp, second control means for varying the illumination of the second lamp, motor means operable for controlling the first and second control means in opposite senses to vary a ratio of illumination fo the first and second lamps, a normally balanced bridge network for controlling the operation of the motor means, and said bridge network including means responsive to changes in altitude of the aircraft for unbalancing the bridge network to effect operation of the motor means and thereby the first and second control means to vary the ratio of illumination of the first and second lamps and the resulting fog pattern produced by the first means, and said bridge network including light sensitive means responsive to the illumination of said first and second lamps to rebalance the bridge network in response to the variance in the ratio of the illumination thereof.

26. A display apparatus as defined by claim 25 including a second motor means operable for controlling the first and second control means to vary the intensity of illumination of the first and second lamps in like senses, a normally balanced second bridge network for controlling the operation of the second motor means, and said second bridge network including means responsive to changes in altitude of the aircraft for unbalancing the second bridge network to effect operation of the second motor means and thereby the first and second control means to vary the intensity of illumination of the first and second lamps in like senses and the resulting fog pattern produced by the first means, and said second bridge network including light sensitive means responsive to the intensity of illumination of said first and second lamps to rebalance the second bridge network in response to the variance in the intensity of the illumination of said lamps.

27. A display apparatus as defined by claim 25 including a second motor means operable for controlling the first and second control means to vary the intensity of illumination of the first and second lamps in like senses, a normally balanced second bridge network for controlling the operation of the second motor means, and said second bridge network including ambient light sensitive means responsive to changes in ground brightness at the prevailing altitude of the aircraft for unbalancing the second bridge network to effect operation of the second motor means and thereby the first and second control means to vary the intensity of illumination of the first and second lamps in direct relation to the sensed changes in the ground brightness, and said second bridge network including light sensitive means responsive to the intensity of illumination of said first and second lamps to rebalance the second bridge network in response to the variance in the intensity of the illumination of said lamps.

28. A display apparatus as defined by claim 25 including a second motor means operable for controlling the first and second control means to vary the intensity of illumination of the first and second lamps in like senses, a normally balanced second bridge network for controlling the operation of the second motor means, and said second bridge network including aircraft pitch sensitive means responsive to a change in the pitch attitude of the aircraft for unbalancing the second bridge network to effect operation of the second motor means and thereby the first and second control means to vary the intensity of illumination of the first and second lamps so as to increase the intensity of illumination of both of said lamps upon an upward pitch of the aircraft and to decrease the intensity of illumination of both of said lamps upon a downward pitch of the aircraft, and said second bridge network including light sensitive means responsive to the intensity of illumination of said first and second lamps to rebalance the second bridge network in response to the variance in the intensity of the illumination of said lamps.

29. A display apparatus as defined by claim 28 including altitude responsive means to cause an increase in effectiveness of the aircraft pitch sensitive means upon a decrease in the altitude of the aircraft and a decrease in effectiveness of the aircraft pitch sensitive means upon an increase in the altitude of the aircraft.

30. A display apparatus as defined by claim 25 including a second motor means operable for controlling the first and second control means to vary the intensity of illumination of the first and second lamps in like senses, a normally balance second bridge network for controlling the operation of the second motor means, and said second bridge network including operating means for unbalancing the second bridge network to effect operation of the second motor means and thereby the first and second control means to vary the intensity of illumination of the first and second lamps in like senses, said operating means including means responsive to changes in altitude of the aircraft to unbalance the second bridge network to cause the operation of said second motor means to vary the intensity of the illumination of said lamps in accordance with a predetermined program, ambient light sensitive means responsive to changes in ground brightness at the prevailing altitude of the aircraft to unbalance the second bridge network to cause the operation of said second motor means to vary the intensity of the illumination of said lamps in direct relation to the sensed changes in the ground brightness, aircraft pitch sensitive means responsive to a change in the pitch attitude of the aircraft to unbalance the second bridge network to cause the operation of said second motor means to increase the intensity of illumination of said lamps upon an upward pitch of the aircraft and to decrease the intensity of illumination of said lamps upon a downward pitch of the aircraft, and other means responsive to changes in the altitude of the aircraft and operatively connected to said aircraft pitch sensitive means to cause an increase in effectiveness of the aircraft pitch sensitive means upon a decrease in altitude of the aircraft and a decrease in effectiveness of the aircraft pitch sensitive means upon an increase in the altitude of the aircraft, and said second bridge network including light sensitive means responsive to the intensity of illumination of said first and second lamps to rebalance the second bridge network in response to the variance in the intensity of the illumination of said lamps.

31. In an aircraft, a display apparatus for visually simulating fog on a visual scene to be viewed by an observer in the aircraft, said display apparatus comprising first means for producing a collimated fog pattern, means for combining the collimated fog pattern on the visual scene as viewed by the observer, said first means including a fog pattern attenuator, a first lamp for illuminating the fog pattern attenuator, a second lamp for providing a background illumination, means for combining light rays from the fog pattern attenuator with light rays from the background illumination and directing the combined light rays to the means for combining the collimated fog pattern on the visual scene as viewed by the observer, first control means for varying the illumination of the first lamp, second control means for varying the illumination of the second lamp, motor means operable for controlling the first and second control means in like senses to vary intensity of illumination of the first and second lamps, and normally balanced bridge network for controlling the operation of the motor means, and said bridge network including means responsive to changes in a flight condition of the aircraft for unbalancing the bridge network to effect operation of the motor means and thereby the first and second control means to vary the intensity of illumination of the first and second lamps and the resulting collimated fog pattern produced by the first means, and said bridge network including light sensitive means responsive to the illumination of said first and second lamps to rebalance the bridge network in response to the variance in the intensity of the illumination thereof.

32. In an aircraft, a display apparatus for visually simulating fog on a visual scene to be viewed by an observer in the aircraft, said display apparatus comprising first means for producing a collimated fog pattern, means for combining the collimated fog pattern on the visual scene as viewed by the observer, said first means including illuminating means to produce the fog pattern, and ambient light sensitive means so positioned in relation to the aircraft, as to sense average ground brightness below the aircraft, and said ambient light sensitive means being effective to vary illumination of the illuminating means in direct relation to the sensed average brightness of the ground during flight of the aircraft.

References Cited

UNITED STATES PATENTS

| 2,061,378 | 11/1936 | Henze et al. | 88—24 |
| 2,336,508 | 12/1943 | Smith et al. | 88—24 |
| 2,517,779 | 8/1950 | Flint | 88—2.4 |
| 2,621,555 | 12/1952 | Fleming-Williams et al. | 88—14 |
| 3,089,256 | 5/1963 | Long | 35—12 |
| 3,234,665 | 2/1966 | Sear et al. | 35—25 |
| 3,237,194 | 2/1966 | Curry et al. | 343—108 |
| 3,258,855 | 7/1966 | Flower et al. | 35—12 |

OTHER REFERENCES

M. B. Diegert: Earth sighting simulator, IBM technical disclosure bulletin, vol. 8, No. 1, June 1965.

EUGENE R. CAPOZIO, *Primary Examiner.*

PAUL V. WILLIAMS, *Assistant Examiner.*

UNITED STATES PATENT OFFICE
CERTIFICATE OF CORRECTION

Patent No. 3,436,840            Dated April 8, 1969

Inventor(s) Paul A. Noxon

It is certified that error appears in the above-identified patent and that said Letters Patent are hereby corrected as shown below:

In claim 2, column 7, line 5, change the word "screen" to - - second - - .

In claim 23, column 20, line 51, after "in" insert - - which the third means includes means responsive to - - .

SIGNED AND
SEALED
DEC 23 1969

(SEAL)
Attest:

Edward M. Fletcher, Jr.            WILLIAM E. SCHUYLER, JR.
Attesting Officer                  Commissioner of Patents